United States Patent Office 3,730,949
Patented May 1, 1973

3,730,949
THERMOSTABLE AND THERMOPLASTIC LINEAR POLYTHIOETHERS
Camille Jungblut, 1 Tour Aquitaine, 92 Courbevoie, France
No Drawing. Continuation-in-part of application Ser. No. 22,048, Mar. 23, 1970. This application Oct. 1, 1971, Ser. No. 185,825
Int. Cl. C08g 33/10
U.S. Cl. 260—47 R  6 Claims

ABSTRACT OF THE DISCLOSURE

Linear thermoplastics, having exceptional thermal stability and weather resistance, of the general formula $$\{S-R-S-R'\}$$

in which R is a bifunctional aromatic radical and R' is an aromatic-like 6-membered ring compound containing 2 nitrogen heteroatoms and 3 conjugated double bonds in the ring, selected from the group consisting of pyridazine, phthalazine, pyrazine, and pyrimidine, and the process for producing these polymers by the polycondensation of a salt of an aromatic dithiol with the dihalogenated derivative of pyridazine, phthalazine, pyrazine or pyrimidine under specified conditions are disclosed.

CROSS REFERENCE TO RELATED APPLICATION

This is a continuation-in-part of my copending application Ser. No. 22,048, filed Mar. 23, 1970, of the same title, now abandoned.

This invention relates to new exceptionally thermostable and weather resistant thermoplastic linear polythioethers, having the general formula (1) $\quad\{S-R-S-R'\}_n$ in which R is a bifunctional aromatic group in which R' is a 6-membered aromatic-like ring having two nitrogen heteroatoms and 3 conjugated double bonds in the ring, i.e. a two nitrogen containing nitrogen heterocycle compound, the 6-membered ring nucleus being selected from the group consisting of pyridazine, phthalazine, pyrazine and pyrimidine. The term "bifunctional" means that the aromatic group, e.g. a phenyl nucleus, has two ring sites bonded to a substituent group or atom. In this case the sites are bonded to the thiol group or, in the polymer, the —S— radical.

Aromatic polythioethers are known, particularly from the works of

A. D. Macallum, J. Org. Chem., vol. 13, p. 154.
R. W. Lenz, J. Polymeric Sc., vol. 58, p. 351.
C. C. Price, J. Polymer Sc., 1964, p. 1511.
H. A. Smith, Rubber Plastics Age, vol. 44, p. 1048.

These compounds possess a remarkable resistance to heat, thermostability. However, high molecular weights are difficult to obtain with these compounds.

The polythioethers according to this invention are remarkable for excellent resistance to heat between 300° C. and 400° C., and for there excellent thermoplastic qualities.

The present polythioethers are obtained by polycondensation of an alkali metal (Group I-A) or alkaline earth metal (Group II-A) salt of an aromatic dithiol compound with a dihalogenated compound of labile halogens carried by the 6-membered ring previously described.

The dithiol compounds are represented by the general formula (2) $\quad$ HS—R—SH in which R is an aromatic radical. The term "aromatic" means a derivative of benzene in which the molecule contains one or more homocyclic carbon rings with the characteristic conjugated (resonant) bonds. The aromatic radical can be composed of a single phenyl nucleus, substituted or not by substituents which are inert under the reaction conditions employed in the polycondensation polymerization of the polythioethers of this invention. The thiol (SH) groups are preferably on the carbon atoms of the aromatic nucleus in either meta or para position with respect to each other.

These dithiols can correspond to the structure

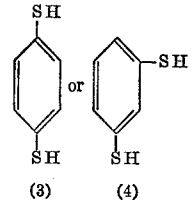

(3)  (4)

the aromatic radical R can also be composed of 2 aromatic nuclei, corresponding to the structures

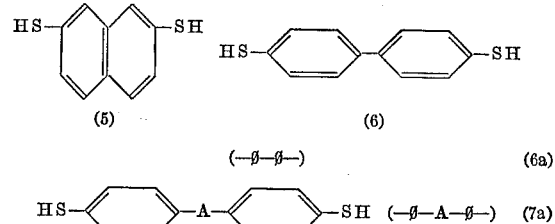

(5)  (6)

(—ϕ—ϕ—)  (6a)

HS—⟨ ⟩—A—⟨ ⟩—SH  (—ϕ—A—ϕ—)  (7a)

wherein the 2 phenyl radicals (represented also by "ϕ") can be fused to form polycyclic compounds in which 2 rings have two atoms in common, for example 2,7-dithiol-naphthalene, wherein the two phenyl radicals can be linked by a single bond, of the diphenyl type, for example, or by a linking group A which may be selected from the group consisting of —N=N—, —CH$_2$—, —CH$_2$—CH$_2$—, —O—,
—H$_2$C—O—CH$_2$—, —SO—, —S—, —CO—, —S—S—,
—C(CH$_3$)$_2$—, and —SO$_2$—.

Exemplary (but not limiting) of the aromatic dithiols useful in this invention and falling within the above-defined class of compounds are 4,4'-dimercapto-diphenyl-methane,
4,4'-dimercapto-diphenyl-ether,
4,4'-dimercapto-diphenyl-sulphide,
4,4'-dimercapto-diphenyl-sulphone,
4,4'-dimercapto-diphenyl-2,2-propane,
4,4'-dimercapto-benzo-phenone, and
4,4'-dimercapto-diphenyl-sulphoxide.

The dihalogenated compounds useful in this invention are represented by the formula (8)  X—R'—X wherein X is a halogen, fluorine, chlorine, bromine or iodine, and wherein R' is a 6-membered aromatic-like ring compound containing 2 nitrogen heteroatoms and is characterized by 3 conjugated (resonant) double bonds, analogous to the aromatic resonant unsaturation as found in benzene. The term "aromatic-like" as used herein with respect to 6-membered rings has reference to a 6-membered cyclic nucleus having resonant conjugated bonds, such as found in typical unsaturated nitrogen heterocyclic compounds, e.g. pyridazine, pyrimidine, pyrazine, and includes fused nuclei compounds of the type exemplified by phthalazine.

The nitrogen heteroatoms (so called because of the heterocyclic nature of the aromatic-like nuclei), may be in the ortho, meta or para positions relative to each other. The 6-membered aromatic-like nitrogen heterocycle nuclei may be substituted in either ortho or para positions, with respect to the halogen substituents, by strongly electron attracting groups such as —NO₂, —COOR″, —SO₃R″, —CHO, wherein R″ is a hydrogen, or an alkyl, or aryl radical. Typical, non-limiting, examples of the class of compounds useful in this invention are the following:

2,4 dichloro-pyrimidine (9) 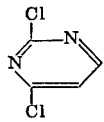

2,4 dichloro-5-nitro-pyrimidine

(10) 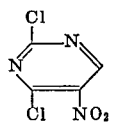

4,6 dichloro-pyrimidine

(11) 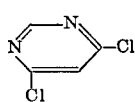

4,6 dichloro-5-nitro-pyrimidine

(12) 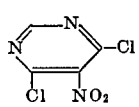

3,6 dichloro-pyridazine

(13) 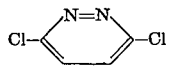

3,6 dichloro-phthalazine

(14) 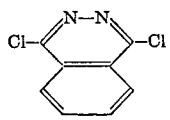

2,3 dichloro-pyrazine

(15) 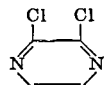

2,5 dichloro-pyrazine

(16) 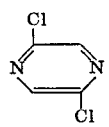

2,6 dichloro-pyrazine

(17) 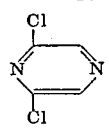

2,6 dichloro-4-pyrimidine carboxylic acid

(18) 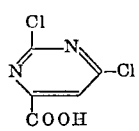

3,6 dichloro-4-pyridazine carboxylic acid

(19) 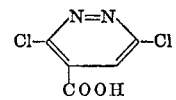

The polycondensation preferably takes place in strongly polar solvent and the most valuable solvents are those in which the starting products are soluble. Non-limiting examples of these solvents are the following:

dimethyl formamide
dimethyl acetamide
dimethyl sulphoxide
hexamethyl phospho-triamide
N-methyl pyrrolidone
tetra-hydrothiophene-1,1-dioxide (sulpholane)
Dimethyl or diethyl ether of diethylene-glycol In practice, the alkali metal salt or alkaline earth metal salt of the dithiol compound is prepared directly in the solution by the addition of the calculated stoichiometric quantity of the alkali metal or alkaline earth metal hydroxide. The terms alkali metal and alkaline earth metal are used in their normal sense, i.e. alkali metals are those in Group I-A, e.g., lithium, sodium, potassium, etc., and alkaline earth metals are those in Group II-A, magnesium, calcium, etc. The useful hydroxides include, for example, LiOH, NaOH, Ca(OH)₂, Mg(OH)₂, etc.

The water formed by the reaction of the alkali metal or alkaline earth metal hydroxide is eliminated either by azeotropic distillation, for example by means of benzene or chlorobenzene addition followed by distillation, or by the addition of a water-binding agent, such as magnesium sulphate, calcined sodium (sodium carbonate) or similar desiccant material.

Before the introduction of the dihalogenated compound, the metallic salt, can be prepared separately, then redissolved in the solvent to cause it to react with the dihalogenated compound.

The dithiol, or its salt, and the dihalogenated compound are brought together in stochiometric proportions, although one can employ an excess of one or the other to obtain a polymer of a given molecular weight, the molecular weight being limited by the molecularly less abundant monomer constituent. The reaction is carried out in a non-oxidizing, dry atmosphere which is inert to the constituents of the reaction.

The reaction temperature to be used varies as a function of the reactivity of the compounds and lies between about 30° C. and about 250° C. The reaction temperature is also variable as a function of the solvent, in that the reaction temperature must be maintained at a temperature low enough to prevent decomposition of the solvent. The reaction time depends upon the desired degree of polymerization, desired intrinsic viscosity, and varies from about 2 hours to about 24 hours, typically.

During the course of the reaction, the reaction media must be stirred or agitated sufficiently to maintain a generally homogeneous mixture.

Once the polycondensation polymerization reaction is completed, the polythioether can be separated by various means. For example, separation can be accomplished by precipitation in a suitable solvent, such as with acidic water, acetone, alcohol, or other compounds in which the reaction solvent is highly soluble but in which the polythioether has little or no solubility. Separation can also be accomplished by a simple distillation of the solvent from the polymer.

The final product is characterized by thermogravimetric analysis and by intrinsic viscosity in an appropriate solvent, as is conventionally done in polymer chemistry.

The polythioether thus formed consists of regularly alternating R and R′ radicals interconnected by —S— radicals.

Example 1

To 100 ml. of water there are added 14.279 grams of 4,4'-dimarcapto-diphenyl ether and 121.2 ml. of 1 normal monohydrate lithium hydroxide. The mixture is stirred until dissolved and is then heated without boiling so as to complete the dissolving. The few insoluble residues are filtered out and the solution is evaporated to dryness in a rotary evaporator. The dilithiated salt is obtained.

2.46 grams of this dilithiated salt are suspended in 50 ml. of dimethyl formamide with 1.49 grams of 3,6 dichloropyridazine. While stirring in an atmosphere of nitrogen, the mixture is heated for 8 hours at 140° C. The polymer is then precipitated in 200 ml. of 10 normal nitric acid, and then washed with water and acetone. After drying to constant weight, the polymer has a yellowish colour. The general formula is:

(20)

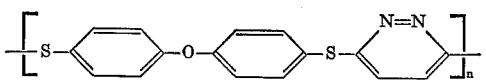

The intrinsic viscosity in N-methyl-pyrrolidone at 25° C. is 0.25. On thermal analysis, the polymer shows a loss of 2.5% by weight at 360° C. and 12% at 400° C.

It gives a strong, flexible, transparent film from a solution of dimethyl formamide.

Example 2

2.34 grams of 4,4'-dimercapto-diphenyl ether are dissolved in 50 ml. of dimethyl formamide. To this are added 1.59 grams of soda at 50.3% and 10 ml. of benzene. After elimination of the water by azeotropic distillation, there are added while cold 1.49 grams of 3,6-dichloro-pyridazine and the mixture is heated for 24 hours at 140° under nitrogen and with agitation. There are obtained 3.88 grams of polymer precipitated in the solution (83% of the theoretical quantity) and this is treated as in Example 1.

The polymer softens in the temperature range 210–230° C. and has an intrinsic viscosity in N methyl-pyrrolidone of 0.80 at 25° C. (0.2% solution).

On thermogravitmetric analysis, the polymer shows a loss of weight of 0% at 360° C. and 10% at 400° C.

From a solution of N methyl-pyrrolidone, it gives a strong, flexible, transparent film.

Example 3

2.46 grams of dilithiated salt of 4,4'-dithiol-diphenyl-ether and 1.49 grams of 2,4-dichloro-pyrimidine are suspended in 50 ml. of dimethylformamide. The mixture is heated for 16 hours at 140° C. with agitation in nitrogen atmosphere. The polymer was recovered by precipitation with 200 ml. of 10 normal nitric acid and, after purification, 2.74 grams of a powdery maroon product was obtained, with a yield of 88 percent.

(21)

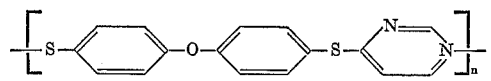

Thermogravimetric analysis showed a weight loss of 2 percent at 425° C. and 12 percent at 450° C. (10 percent minute-rate).

Intrinsic viscosity in methyl pyrrolidone at 25° C. is 0.15.

From a solution of methyl pyrrolidone, this polymer gives a transparent, brittle film by evaporation of the solvent.

The polythioethers produced according to this invention find applications in the fabrication of molded objects, sheets, films, plates, protective films and coatings which are particularly stable under heat and weathering.

It is to be understood that the specific examples set forth hereinbefore are not intended to limit the invention, which is defined in the claims which follow.

What is claimed is:
1. Thermostable and thermoplastic linear polythioethers of the formula

wherein:

$n$ is a positive integer;

R is an aromatic radical which is a single phenyl nucleus, or two phenyl nuclei fused to form a polycyclic radical in which two resonant rings have two atoms in common, or two phenyl nuclei linked by a single bond, or two phenyl nuclei linked by a group selected from the group consisting of

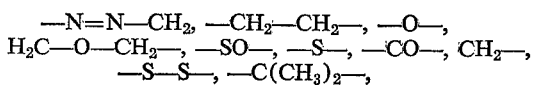

and

said phenyl nuclei being unsubstituted or being substituted with substituents which are inert under the reaction conditions employed in the polycondensation polymerization of said polythioethers; and R' is a radical containing a 6-membered cyclic nucleus containing two nitrogen atoms characterized by three conjugated resonant double bonds, said nucleus being unsubstituted, or fused to form a polycyclic radical in which two resonant rings have two atoms in common, or substituted with one or more strongly electron attracting groups selected from the group consisting of, $-NO_2$, $-COOR''$, $-SO_3R''$, $-CHO$, wherein R'' is a hydrogen, or an alkyl, or aryl radical.

2. Polythioethers as defined in claim 1 wherein the aromatic radical R has the formula

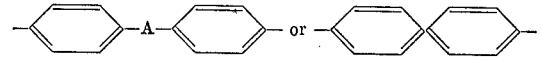

wherein A is selected from the group consisting of

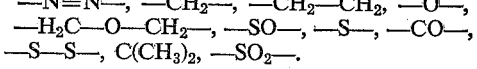

3. Polythioethers as defined in claim 2 wherein the aromatic radical R appears at regular intervals in the polymer and is selected from the group consisting of radicals which result from removal of both mercaptohydrogens from 4,4'-dimercapto-diphenyl-methane,
4,4'-dimercapto-diphenyl-ether,
4,4'-dimercapto-diphenyl-sulphide,
4,4'-dimercapto-diphenyl-sulphone,
4,4'-dimercapto-diphenyl-2,2-propane,
4,4'-dimercapto-benzo-phenone, or
4,4'-dimercapto-diphenyl-sulphoxide.

4. Polythioethers as defined in claim 3 wherein the radical R' appears at regular intervals in the polymer and is selected from the group consisting of radicals which result from removal of both chlorine atoms from 2,4-dichloro-pyrimidine,
2,4-dichloro-5-nitro-pyrimidine,
4,6-dichloro-pyrimidine,
4,6-dichloro-5-nitro-pyrimidine,
2,6-dichloro-4-pyrimidine carboxylic acid,
3,6-dichloro-pyridazine,
3,6-dichloro-phthalazine,
3,6-dichloro-4-pyridazine carboxylic acid,
2,3-dichloro-pyrazine,
2,5-dichloro-pyrazine, or
2,6-dichloro-pyrazine.

5. Polythioethers as defined in claim 2 wherein the radical R' appears at regular intervals in the polymer and is selected from the group consisting of radicals which result from removal of both chlorine atoms from 2,4-dichloro-pyrimidine,
2,4-dichloro-5-nitro-pyrimidine,
4,6-dichloro-pyrimidine,
4,6-dichloro-5-nitro-pyrimidine,
2,6-dichloro-4-pyrimidine carboxylic acid,
3,6-dichloro-pyridazine,
3,6-dichloro-phthalazine,
3,6-dichloro-4-pyridazine carboxylic acid,
2,3-dichloro-pyrazine,
2,5-dichloro-pyrazine, or
2,6-dichloro-pyrazine.

6. Polythioethers as defined in claim 1 wherein the radical R' appears at regular intervals in the polymer and is selected from the group consisting of radicals which result from removal of both chlorine atoms from 2,4-dichloro-pyrimidine,
2,4-dichloro-5-nitro-pyrimidine,
4,6-dichloro-pyrimidine,
4,6-dichloro-5-nitro-pyrimidine,
2,6-dichloro-4-pyrimidine carboxylic acid,
3,6-dichloro-pyridazine,
3,6-dichloro-phthalazine,
3,6-dichloro-4-pyridazine carboxylic acid,
2,3-dichloro-pyrazine,
2,5-dichloro-pyrazine, or
2,6-dichloro-pyrazine.

References Cited
UNITED STATES PATENTS

| | | | |
|---|---|---|---|
| 3,432,468 | 3/1969 | Gabler | 260—47 R |
| 3,547,887 | 12/1970 | Gabler et al. | 260—47 R |
| 2,822,351 | 2/1958 | Kreuchunas | 260—79.3 |

DONALD E. CZAJA, Primary Examiner

M. I. MARQUIS, Assistant Examiner

U.S. Cl. X.R.

117—161 UN; 260—49, 79, 79.1, 79.3 R, 79.3 M